April 10, 1956     L. REALE     2,741,560
PROCESS FOR PRESERVING BANANAS
Filed Feb. 23, 1954
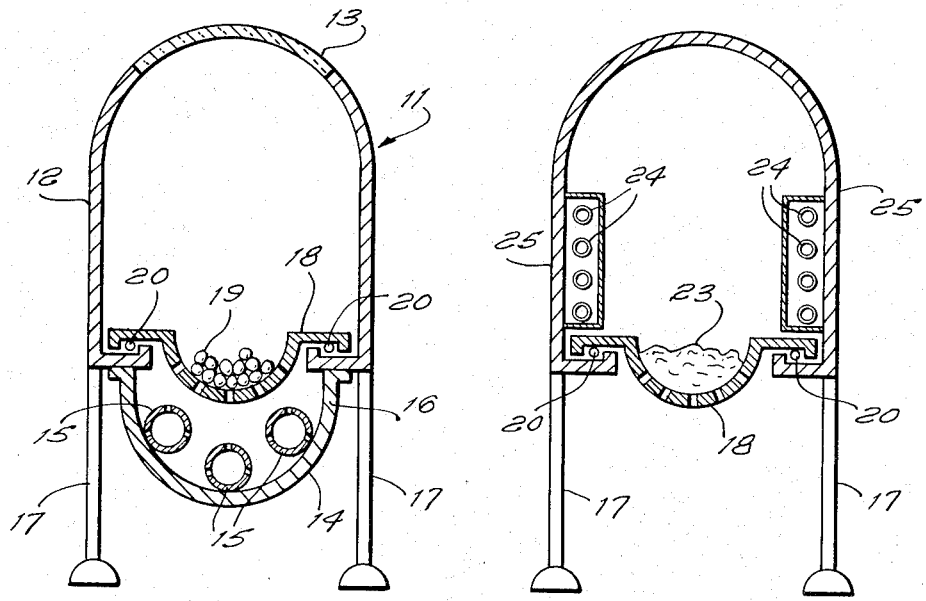
FIG.1.
FIG.3.
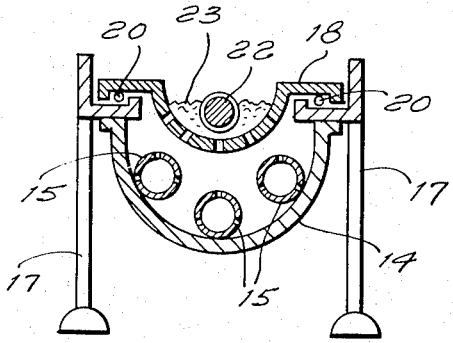
FIG.2.
INVENTOR.
LUCIO REALE
BY

United States Patent Office 2,741,560
Patented Apr. 10, 1956

2,741,560
PROCESS FOR PRESERVING BANANAS
Lucio Reale, La Ceiba, Honduras
Application February 23, 1954, Serial No. 412,031
2 Claims. (Cl. 99—193)

The present invention relates to an improved process for preserving bananas.

It is an object of the present invention to provide a new process for preserving bananas in which the bananas retain their natural color and fresh flavor and food value.

It is another object of the present invention to provide a new process for preserving bananas in which the advantageous characteristics noted above will be retained for long periods of time.

It is still another object of the present invention to provide a process for greatly reducing the bulk and weight of the bananas during the preserving of the bananas without adversely affecting their color, flavor or food value.

It is yet another object of the present invention to provide a process for preserving bananas which is equally applicable to the ripened fruit and the green fruit.

With the above objects in view, the present invention mainly consists of the steps of removing the skin and the seeds from the bananas, applying steam to the bananas so as to partially evaporate the liquid therefrom, and then quick-freezing the resultant partially evaporated bananas.

In a preferred embodiment of the invention, steam is first applied to the bananas at a relatively high pressure for a short period of time so as to soften the bananas and begin the evaporation process and then steam is applied to the softened banana mass at a lower pressure for a somewhat longer period of time in order to speed up the evaporation of liquid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a cross-sectional view of a portion of an apparatus for performing one of the steps in the preserving process in accordance with the invention;

Fig. 2 is a cross-sectional view of another portion of an apparatus for performing another of the steps in the preserving process in accordance with the invention; and Fig. 3 is a cross-sectional view of a third portion of an apparatus for performing still another of the steps in the preserving process in accordance with the invention.

Referring now to Fig. 1, there is shown a hermetically sealed closure 11 formed of a metal wall portion 12 and a glass wall portion 13, the glass wall portion enabling the inside of the closure to be viewed. Mounted in the closure is a grill 18 which is movable by means of cables 20 in the direction of the axes of the cables. Peeled and deseeded bananas 19 are in place on the grill. Beneath the grill is another wall portion 14 within which are a plurality of pipes 15 which carry steam and which have openings therein for permitting the steam to escape. The entire closure is mounted on a stand 17.

In accordance with the invention the bananas to be preserved are first peeled and cleaned of seeds and outside surface fiber. They are then placed on the grill 18 and the closure 11 is sealed off. Steam is applied to the bananas 19 by means of steam pipes 15. In a preferred embodiment of the present invention the steam is applied for a period of approximately one minute at a pressure of approximately 60 lbs. per square inch and a temperature of approximately 290° F. It has been discovered that the application of steam causes the water within the bananas to begin evaporating and the bananas to soften.

Figure 2 is a cross-sectional view of another portion of the apparatus, this one for performing the second step in the preserving process. It includes the grill 18 mounted on conveyer cables 20 and containing therein the softened mass of bananas 23. As in Figure 1, there are provided the steam pipes 15 within the closure 14. The entire assembly is mounted on supports 17. In order to stir the bananas mass, there is provided a worm screw arrangement 22.

After the completion of the step already described in which the bananas are subjected to steam at relatively high pressure for a short period of time they are moved from the hermetically sealed closure shown in Fig. 1 to the opened section of the apparatus shown in Fig. 2. The softened mass is turned continually by means of the worm screw 22 so that all portions of the mass may be equally subjected to steam. In a preferred embodiment, steam is applied at atmospheric pressure and at a temperature about 212° F. for a period of 3 to 5 minutes or a somewhat longer period of time depending upon the concentration of bananas desired. This second application of steam at reduced pressure for a relatively longer period of time causes further evaporation of liquid from the bananas and further reduction in the volume of the banana mass. With the process described so far, it has been found possible to reduce the volume of the bananas by about 70% and the weight by about 40%.

After the bananas have been concentrated the desired amount, the grill 18 is moved by means of the conveyer cables 20 to a third portion of the apparatus for preserving the bananas as shown in cross-section in Fig. 3. In this portion, there are mounted to the walls 25 refrigeration coils 24 for quickly cooling the mass of bananas. The bananas may be cooled for a period of 5 to 10 minutes at a temperature of about 20 degrees Fahrenheit. The bananas are then molded into a package of convenient size and quick frozen.

If desired, the bananas may be formed into a dessert by quick freezing the bananas in the shape of an ice cream pop, the frozen mass being mounted on a stick in the well known manner. The frozen banana pop may then be dipped into chocolate or any other substance it is desired to apply to the pop as an outer covering therefore.

In a preferred embodiment of the invention, Figs. 1, 2 and 3 comprise a single machine. The grill 18 may be formed as a continuous member or as a plurality of sections movable from one portion of the machine to another portion of the machine by means of a conveyer system such as conveyer cables 20. The cleaned and deseeded bananas are placed on the grill in the first portion of the machine (Fig. 1), the closure 11 is hermetically sealed, and steam applied at high pressure and temperature, as already described, by means of steam pipes running beneath the grill. The grill moves continually and, after the required time interval, it moves out of the hermetically sealed portion of the machine and into the portion thereof open to the free air, as illustrated in Fig. 2. Means, not illustrated here, but well known in the art are provided for allowing the movement of the conveyer from inside of the hermetically sealed pressurized portion of the machine to the portion thereof open to the free air. This may comprise a plurality of chambers of decreasing pressure sealed from one another by means of flaps, or a pressure valve arrangement for quickly allowing the pressure to be removed from the hermetically sealed closure and then quickly reestablished the pressure therein.

As already mentioned, in the portion of the machine illustrated in Fig. 2 the banana mass 23 is continually turned by means of worm screw 22 and steam is applied to the mass at reduced pressure and temperature for a period of time sufficient to attain the desired banana concentration. Although shown in Fig. 2 as being exposed to the free air, it should be understood that the process may be somewhat speeded if steam is applied to the bananas in a chamber which is partially evacuated so that the moisture more quickly evaporates from the bananas.

The bananas continue to move along with the grill 18 until, at the end of the period of time required for concentrating the bananas, they are moved into the portion of the machine illustrated in Fig. 3. Here, the bananas are cooled and then the bananas may be removed and quick frozen.

The process described above is equally applicable to the preservation of ripened bananas and green bananas. In the latter case, before subjecting the bananas to the first step in the process, the unpeeled bananas are exposed to hot steam for several minutes in order to soften the peel and thereby facilitate the peeling of the bananas. After peeling the green bananas, they are deseeded and placed on the conveyer and subjected to the process already described.

The process above has been described in connection with a continuously moving conveyer system. It should be understood, however, that the separate steps in the process may be performed by separate machines, the bananas being placed from one machine to the next by hand. Also, although in the described process the steam is provided by means of pipes, it should be understood that the steam may instead be provided by boiling a container of water directly under the grill upon which the bananas are placed. Finally, it should be understood that stirring arrangements other than a worm screw may be employed.

It has been found that bananas prepared according to the novel process described herein retain their fresh flavor and do not become dark after they are frozen. The bananas also retain their food value. Bananas preserved according to the process described have been maintained in excellent, useable condition for periods exceeding 8 months.

While the invention has been described as embodied in a process for preserving bananas, it is not intended to be limited to the details shown, since various modifications may be made in the process and in the structure provided for performing the process without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for preserving bananas comprising the steps of removing the skin and seeds from the bananas; applying steam at a pressure of about 60 lbs. per square inch and temperature of about 290 degrees F. to the pealed and deseeded bananas for about 1 minute so as to soften the bananas and partially evaporate the liquid therefrom; stirring the softened bananas while applying steam at atmospheric pressure and a temperature of about 212 degrees F. thereto for about 3–5 minutes so as to partially evaporate more of the liquid therefrom; and then quick freezing the resultant product.

2. A process for preserving bananas comprising the steps of removing the skin and seeds from the bananas; applying steam to the peeled and deseeded bananas at a pressure of about 60 lbs. per square inch and a temperature of about 290 degrees F. for about one minute so as to soften the bananas; applying steam to the softened bananas at approximately atmospheric pressure and a temperature of about 212 degrees F. for a period of about 3–5 minutes, while stirring the softened bananas, so as to partially evaporate a substantial portion of the liquid therefrom; cooling the partially evaporated bananas; quick freezing the resultant partially evaporated bananas in the form of an ice cream pop; and coating the quick frozen bananas in the form of said ice cream pop with chocolate.

References Cited in the file of this patent

UNITED STATES PATENTS

| | | |
|---|---|---|
| 1,017,411 | Harris et al. | Feb. 13, 1912 |
| 1,908,489 | Sartakoff | May 9, 1933 |
| 2,192,273 | Ray | Mar. 5, 1940 |
| 2,278,472 | Musher | Apr. 7, 1942 |
| 2,474,649 | Birdseye | June 28, 1949 |
| 2,592,332 | Reale | Apr. 8, 1952 |

FOREIGN PATENTS

| | | |
|---|---|---|
| 21,038 of 1892 | Great Britain | Sept. 23, 1893 |